United States Patent [19]
Ghidoni et al.

[11] Patent Number: 5,290,837
[45] Date of Patent: Mar. 1, 1994

[54] THERMOPLASTIC COMPOSITIONS BASED ON A POLYOLEFINE AND A VINYL AROMATICPOLYMER

[75] Inventors: Dario Ghidoni; Gian C. Fasulo; Aldo Longo, all of Mantova; Italo Borghi, Ferrara, all of Italy

[73] Assignee: ECP Enichem Polimeri S.r.L., Milan, Italy

[21] Appl. No.: 789,925

[22] Filed: Nov. 12, 1991

[30] Foreign Application Priority Data

Nov. 12, 1990 [IT] Italy .................. 22022 A/90

[51] Int. Cl.$^5$ .............. C08L 25/02; C08L 23/02; C08L 53/02
[52] U.S. Cl. ...................... 524/126; 525/71; 525/75; 525/95; 525/98; 525/99; 524/147; 524/323; 524/504
[58] Field of Search .............. 525/71, 98, 99, 95, 525/89, 75

[56] References Cited

U.S. PATENT DOCUMENTS

| 4,690,976 | 9/1987 | Hahnfeld | 525/70 |
| 4,910,254 | 3/1990 | Johnston | 525/75 |
| 4,937,280 | 6/1990 | Biglione | 525/504 |
| 4,939,207 | 7/1990 | Fasulo et al. | 525/89 |
| 5,198,495 | 3/1993 | Fasulo et al. | |

FOREIGN PATENT DOCUMENTS 0195829 10/1986 European Pat. Off. .
0421359 10/1991 European Pat. Off. .

*Primary Examiner*—James J. Seidleck
*Assistant Examiner*—Patrick R. Delaney
*Attorney, Agent, or Firm*—Oblon, Spivak, McClelland, Maier & Neustadt

[57] ABSTRACT

A thermoplastic composition based on a polyolefin and a vinyl aromatic polymer, having an improved combi7 nation of physical, mechanical and thermal properties, comprising:

from 40 to 80% by weight of a vinyl aromatic polymer (A) containing, as an elastomeric component, from 0.5 to 5% by weight of a vinyl aromatic monomer - conjugated diene linear block polymer and from 5 to 15% of a diene rubber, from 5 to 50% by weight of a polyolefin (B) and from 10 to 50% by weight of an olefinic elastomer (C) containing, grafted thereon, a vinyl aromatic polymer, wherein the molar ratio between the vinyl aromatic polymer and the olefinic elastomer in the grafted phrase is greater than 0.8, the sum of components (A), (B) and (C) being equal to 100%.

21 Claims, No Drawings

5,290,837

THERMOPLASTIC COMPOSITIONS BASED ON A POLYOLEFINE AND A VINYL AROMATICPOLYMER

BACKGROUND OF THE INVENTION

1. Field of the Invention

The present invention relates to thermoplastic compositions based on a polyolefin and a vinyl aromatic polymer. More particularly, the present invention relates to thermoplastic compositions based on a polyolefin and a vinyl aromatic polymer endowed with an optimal combination of properties, including thermoformability, moldability, thermal resistance, modulus, resilience, resistance to naturally-occurring organic substances which tend to accelerate the degradation of some polymers, etc.

2. Description of the Background

Such particular combination of properties makes the compositions of the present invention particularly suitable for the production of shaped articles by any forming technique known for the thermoplastic resins, such as thermoforming, injection molding, forging, rotational molding and the like.

As is known, vinyl aromatic polymers are thermoplastic resins suitable for being transformed, under heating, into shaped articles by injection or extrusion molding. Said vinyl aromatic polymers have a fair tenacity, but they are not suitable for use in applications where a high tenacity associated with good chemical resistance is required.

A way to improve this deficiency in properties is to provide blends with other polymers which do not lack these properties to obtain a material exhibiting the desired combination of properties. However, this approach has only been successful in a few cases; generally, in fact, the blending results in the combination of the worst characteristics of each component, the overall result being a material of such poor properties as not to be of any practical or commercial value.

The reasons for this drawback are the fact that not all polymers are compatible with each other and, therefore, do not perfectly adhere. As a result, interfaces are formed among the components of the blend which represent weakness and breaking points.

More particularly, mixtures based on polystyrene, or generally on a vinyl aromatic polymer or copolymer, either as such or made impact resistant by grafting it onto a rubber, and onto a polyolefin, give rise to blends endowed with heterogeneous structure and mechanical weakness, due to the incompatibility between these two types of polymers.

Many attempts to solve the incompatibility problem have been made by using defined amounts of the two resins and by making use of a so-called compatibilizing agent.

Thus, for example, U.S. Pat. Nos. 4,386,187 and 4,386,188 describe the use of a styrene-butadiene-styrene block copolymer as compatibilizing agent between the polyolefins and a vinyl aromatic polymer.

Published European Patent Application 60, 524 and Japanese Patent Publication (Kokai) 49-28637/1974 describe the use of styrene-butadiene block copolymers to compatibilize blends of a polyolefin with a high impact polystyrene or styrenic resins.

Published European Patent Application 291,352 discloses polymeric compositions comprising a polyolefin and a vinyl aromatic polymer containing, as elastomeric component, small quantities of a vinyl aromatic monomer-conjugated diene linear block polymer, wherein, as a compatibilizing agent, a vinyl aromatic monomer-conjugated diene star-block polymer is used.

In English Patent 1, 363, 466 and in U.S. Pat. No. 4,020,025, hydrogenated styrene-butadiene di-block copolymers are proposed as compatibilizing agents for polyolefin/styrenic polymer blends.

In the published European Patent Application 60525 and U.S. Pat. No. 4,188,432, a hydrogenated styrene-butadiene-styrene block copolymer, i.e. a styrene-ethylene-butylene-styrene copolymer, is blended with styrenic and olefinic polymers.

In general, however, these approaches have not been industrially successful since the resulting blends, even if they are homogeneous, do not exhibit a satisfactory property combination or have other undesirable properties.

Laid-open European Patent Application 195,829 describes the use of an alpha-olefin copolymer grafted vinyl aromatic polymer, as a compatibilizing agent in the polyolefine-vinyl aromatic polymer blends.

The polymeric compositions disclosed in this European Patent Application comprise: at least 20% by weight (preferably between 20 and 90%) of a polyolefin; at least 5% by weight (preferably between 5 and 75%) of a vinyl aromatic polymer and from 2 to 15% by weight of the alpha-olefin copolymer grafted onto a vinyl aromatic polymer.

Also the compositions so obtained, however, do not exhibit a satisfactory combination of properties for all the uses they are intended for. In particular, an acceptable value of resilience (IZOD) may be obtained by using an excess of polyolefin; this increase, however, occurs to the detriment of the modulus property. By increasing, on the contrary, the amount of the vinyl aromatic polymer, the modulus of the composition increases but to the detriment of the resilience thereof which assumes values of poor use interest.

SUMMARY OF THE INVENTION

Tests which have been carried out as shown that polyolefin/vinyl aromatic polymer thermoplastic compositions endowed with an optimal combination of properties, and, therefore, suitable for being used in all the sectors wherein high physico-mechanical characteristics are required, may be obtained by using a particular type of high-impact vinyl aromatic polymer and, as a compatibilizing agent, an olefinic elastomer containing a vinyl aromatic polymer grafted thereon having a well determined molar ratio between the elastomer and the vinyl aromatic polymer in the grafted phase.

The subject matter of the present invention is, therefore, a thermoplastic composition endowed with an optimal combination of physical-mechanical properties, comprising:

from 40 to 80% by weight of a vinyl aromatic polymer (A) containing, as an elastomer component, from 0.5 to 5% by weight of a vinyl aromatic monomer-conjugated diene linear block polymer and from 5 to 15% of a diene rubber;

from 5 to 50% by weight of a polyolefin (B); and from 10 to 50% by weight of an olefinic elastomer (C) containing a vinyl aromatic polymer grafted thereon, wherein the ratio by moles between the vinyl aromatic polymer and the olefinic elastomer in the grafted phase is greater than 0.8; the sum of the three components (A), (B) and (C) being equal to 100.

Preferably, the thermoplastic/polymeric composition of the present invention comprises the above reported components (A), (B) and (C) in the following proportions, with respect to the sum of the three components:

from 50 to 70% by weight of a vinyl aromatic polymer (A);

from 10 to 30% by weight of a polyolefin (B); and from 10 to 40% by weight of an olefinic elastomer containing a vinyl aromatic polymer grafted thereon (C); the sum of components (A), (B) and (C) being equal to 100.

DETAILED DESCRIPTION OF THE PREFERRED EMBODIMENTS

The vinyl aromatic polymer (A), used in the thermoplastic compositions of the present invention, may be prepared by carrying out the polymerization of a vinyl aromatic monomer having the general formula:

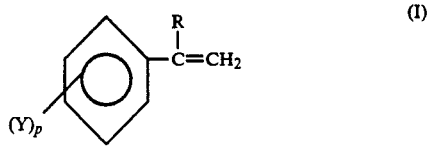

wherein R represents hydrogen or an alkyl radical having from 1 to 4 carbon atoms; p is zero or an integer from 1 to 5, and Y represents a halogen atom or an alkyl radical having from 1 to 4 carbon atoms, in the presence of a diene rubber and of a vinyl aromatic monomer-conjugated diene linear block polymer, in the above stated amount, optionally in the presence of conventional radical polymerization catalysts.

Examples of vinyl aromatic monomers having the above general formula are: styrene; methyl-styrene; mono-, di-, tri-, tetra- and penta-chlorostyrene and the corresponding alpha-methyl-styrenes; styrenes alkylated in the nucleus and the corresponding alpha-methyl-styrenes such as ortho- and para-methyl-styrenes, ortho- and para-ethyl-styrenes; ortho- and para-methyl-alpha-methyl-styrenes, and the like. These monomers may be used either alone or in admixture with each other or with other copolymerizable co-monomers such as, for instance, maleic anhydride, acrylonitrile, methyacrylonitrile, $C_1$–$C_4$ alkyl esters of acrylic or methacrylic acid.

The diene rubber preferably is employed in an amount of from 7 to 12% by weight and may be polybutadiene, low viscosity high or medium cis-polybutadiene, poly-isoprene, copolymers of butadiene and/or isoprene with styrene or with other monomers.

The vinyl aromatic monomer-conjugated diene linear block polymer is preferably is present in an amount of from 2 to 5% by weight. It is per se well known in the art and available on the market. These linear block polymers contain from 20 to 75% by weight of recurring units of a vinyl aromatic monomer and, correspondingly, from 80 to 25% by weight of recurring units of a conjugated diene.

These block polymers can be constituted of pure blocks or can optionally include random or tapered polymeric segments (B/S) or can be constituted of random and/or tapered copolymers.

The above linear block polymers are described by Allen Noshay & James E. McGrath "Block Copolymers" 1977 pages 83–92, 186–192. Further information on the properties, structure and characteristics of these linear block copolymers is reported by Holden et al "Thermoplastic Elastomers" published by N. R. Legge et al. 1987.

Linear block polymers of this type are available on the market for example as "SOLPRENE ® 1205", "SOLPRENE ® 308" and "SOLPRENE ® 314" produced and sold by Phillips Petroleum.

The preparation of the vinyl aromatic polymer (A) can be carried out according to any known suspension, bulk-suspension or continuous bulk polymerization process.

A preferred method of preparation consists in carrying out a pre-polymerization of the vinyl aromatic monomer in the presence of conventional free radical catalysts, of the diene rubber and of the above block polymer, in a first reactor until a conversion of less than 50% by weight of the fed monomers is achieved. Then, the polymerization is completed in one or more subsequent reactors. The thus-obtained polymer is then devolatilized and granulated.

The polyolefine (B) suitable for use in the blends according to the present invention are well known in the art. These polyolefine include, for example, polymers of ethylene, propylene and butene, the copolymers of two or more of these monomers as well as the copolymers of one or more of these monomers with one or more different monomers polymerized therewith. Such different copolymerizable monomers include, for example, olefin monomers having from 5 to 25 carbon atoms, ethylenically unsaturated carboxylic acids (both mono- and di-functional) as well as derivatives of these acids, such as esters and anhydrides. Exemplary monomers which can be copolymerized include acrylic acid, methacrylic acid, vinyl acetate and maleic anhydride and the like. The preferred olefin copolymers contain at least 50% by weight of ethylene, propylene and/or butene and more preferably at least 75% by weight.

The particularly preferred polyolefin is polyethylene including either the linear low density polyethylene (LLDPE) or the medium density or the high density polyethylene. Other polyolefine such as polypropylene and polybutene, as well as the ethylene-propylene copolymers and the ethylene-vinyl acetate (EVA) copolymers, also may be used.

In component (C) of the composition of the present invention, the olefinic elastomer, which constitutes the substrate on which the vinylaromatic polymer is grafted, is a rubber like copolymer, having a Mooney viscosity ranging from 10 to 150 ML-4 at 100° C., of at least two different alpha-mono-olefine having a straight chain such as ethylene, propylene, butene-1, octene-1 and the like, with at least one other copolymerizable monomer, generally a polyene and typically a non-conjugated diene. Preferably one of the alpha-monoolefines is ethylene together with another alpha-monoolefine having a longer chain.

The weight ratio of ethylene to the other alphamonoolefin in the rubber like copolymer is usually in the range of from 20/80 to 80/20. Particularly preferred copolymers are the ethylene/propylene/non-conjugated diene terpolymers in which the non-conjugated diene can be cyclic or acyclic such as: 5-methylene-2-norbornene; 5-ethylidene-2-norbornene; 5-isopropylene-2-norbornene; pentadiene-1,4; hexadiene-1,4; hexadiene-1,5; heptadiene-1,5; dodecatriene-1,7,9; methylheptadiene-1,5; norbornadiene-2,5; cyclo-octadiene-1,5;

dicyclopentadiene; tetrahydroindene; 5-methyl-tetrahydroindene; etc. The diene content ranges from about 2 to 20% by weight and preferably from 8 to 18% by weight of diene monomeric units in the rubber-like terpolymer. Particularly interesting results are obtained by using a rubber-like terpolymer having a Mooney viscosity (ML-4), determined at 100° C., ranging from 30 to 90 and aniodine number higher than 5 and preferably ranging from 10 to 40. The graft or superstrate portion of component (C) is a vinyl aromatic polymer as is defined above.

The grafting reaction of the vinyl aromatic polymer on the elastomeric substrate may be carried out by any of the grafting techniques generally known in the art. Thus, the olefinic elastomeric component can be contacted with the vinyl aromatic monomer or monomers in a polymerization system of well-known bulk, bulk-solution, suspension, bulk-suspension types or the like.

In general, the grafting reaction can be free radical, initiated by thermal, chemical or radiation means, and it can be initiated by anionic or Friedel-Crafts means.

The grafting techniques of vinyl monomers on an olefinic substrate are well known and described, for example, in U.S. Pat. Nos. 3,489,822; 3,489,821; 3,642,950; 3,819,765; 3,538,190; 3,538,191; 3,538,192; 3,671,608; 3,683,050; 3,876,727; 4,340,669.

It is understood that in the grafting polymerization not all the vinyl aromatic monomer is grafted on the rubber like substrate; a portion of the monomer forms a free polymer which is present in physical admixture with the grafted polymer. Preferably the molecular weight of the grafted vinyl aromatic polymer is about equal to that of the non-grafted polymer.

In order to achieve the objects of the present invention, it is necessary that, as said before, the vinyl aromatic polymer/olefinic elastomer molar ratio in the grafted phase be higher than 0.8, and preferably from 1 to 2.

This ratio can be regulated by carrying out the grafting polymerization of the vinyl aromatic monomer on the olefinic elastomer in the presence of variable amounts of initiator, solvent and/or chain transfer, as described in Italian Patent 1,007,901, "La Chimica e l'Industria" vol. 47, n. 4, 1965 and Vol. 59, n. 7, 9 and 10, 1977.

The molecular weight of the vinyl-aromatic polymer grafted on the olefinic support can influence the properties of the compositions; excellent results are obtained with vinylaromatic polymers having a molecular weight higher than 50,000 and up to 500,000 and, preferably, a molecular weight about equal to that of the vinyl aromatic polymer of component (A).

In addition to components A, B and C, the compositions of the present invention can contain reinforcing additives such as for example glass fibers, carbon fibers, organic and inorganic high-modulus fibers, metal fibers, inorganic fillers, etc., as well as flame retarding agents, dyestuffs, pigments, stabilizers, lubricants, etc., which are well-known to those skilled in the art.

The reinforcing additives can be used in amounts generally not exceeding 50% by weight and preferably not higher than 30% by weight calculated on the total composition.

Particularly preferred reinforcing additives are the glass fibers, which can be untreated or, better, treated with silanes or titanates, as is well-known to the technicians and to the manufacturers of such fibers.

Suitable stabilizers to be used in the compositions of the present invention comprise many of the known thermal and oxidation stabilizers which are suitable and generally utilized for vinyl aromatic polymers and/or polyolefine. For example, phosphites, phosponites and hindered phenols can be added to the compositions of the present invention in amounts which can range from 0.05 to 5% by weight.

The method for producing the compositions of the present invention is not critical and any conventional method is utilizable.

Generally, mixing is carried out in the molten state with preliminary pre-mixing at room temperature. The time and temperature are selected and determined as a function of the composition. The temperature are generally in the range of from 180° to 300° C.

Any known mixing unit can be utilized. The method can be continuous or discontinuous. Specifically, single-screw and two-screw extruders, Banbury inner mixers, mixing rollers, Brabender plastographs and the like can be used.

The compositions of the present invention are easily processable by injection molding or by extrusion and exhibit a complex of properties which make them suitable for use in the manufacture of shaped articles having a high impact strength along with a good stiffness and chemical resistance. Thanks to these properties, the compositions of the present invention can be used in the sectors of food packaging and refrigerants.

In order to better understand the present invention and to reduce it to practice, a few illustrative examples are given hereinafter, which however are not limitative of the scope of the invention.

EXAMPLES 1 to 3

In a blender of rotating drum type the following components were blended, at room temperature:

an impact-resistant styrene polymer (A) containing dispersed in the polymeric matrix 7.75% by weight of a polybutadiene rubber and 3% of a linear block polymer (SOLPRENE ® 1205 produced and sold by Phillips Petroleum) containing 25% of styrene and 75% of butadiene and having a molecular weight of 75,000, in the amounts listed in Table I;

a linear low density polyethylene (LLDPE) (B) having a density of 0.926 g/cm$^3$ and an M.F.I. (Melt Flow Index) of 0.7 g/10 min. (at 190° C.-2.16 Kg.), in the amounts listed in Table I; and a polystyrene grafted EDPM elastomer (C), having the following composition: 50% by weight of EPDM (Mooney viscosity equal to 62-72 ML-4 at 100° C. and an iodine number equal to 18), 42% by weight of grafted polystyrene and 8% by weight of free polystyrene having a weight average molecular weight (Mw) equal to 273,000, wherein the polystyrene/elastomer molar ratio in the grafted phase is 1.14, in the amounts listed in Table I.

The blends were homogenized into a Brabender plastograph equipped with a 50 ml cell heated at 200° C.

The Brabender mastication speed was 80 r.p.m. and the residence time of the blend in the plastograph was 3 minutes.

The resulting blends were ground, compression molded at 180° C. and characterized.

The so obtained blends characteristics are indicated in the following Table I.

In Table I, the measured characteristics and the employed methods were as follows:

Mechanical properties

There were determined: the IZOD notch resiliency at 23° C., according to standard ASTM D 256, on 3.2 mm thick specimens; the ultimate tensile strength modulus according to and the elastic standard ASTM D 790.

Thermal properties

The VICAT softening temperature was determined at 1 kg and at 5 kg in oil, according to standard ISO 306.

TABLE I

|  | UNITS | EX. 1 | EX. 2 | EX. 3 |
|---|---|---|---|---|
| COMPONENT A |  | 75 | 66,7 | 58,3 |
| COMPONENT B |  | 15 | 13,3 | 11,7 |
| COMPONENT C |  | 10 | 20 | 30 |
| MECHANICAL PROPERTIES |  |  |  |  |
| IZOD | J/m | 102 | 184 | 400 |
| Ultimate tensile strength | N/mm$^2$ | 32,5 | 32 | 30 |
| Elastic modulus | N/mm$^2$ | 1600 | 1550 | 1350 |
| THERMAL PROPERTIES |  |  |  |  |
| VICAT at 1 kg | °C. | 102 | 101.5 | 101. |
| VICAT at 5 kg | °C. | 89 | 88 | 83 |

The polystyrene/elastomer molar ratio in the grafted phase of component (C) is determined by first removing any materials other than polystyrene (both grafted and free) and EPDM rubber (both grafted and ungrafted. To do this, a 0.5 g of component (C) is dissolved in 5 ml of toluene and to the solution 3 ml of acetone are added. The polymers are precipitated by slowly adding 10 ml of 2-propanol. The mixture is centrifuged and the clear solvent is decanted from the precipitate and discarded.

Next, the free polystyrene is separated from the EPDM rubber and graft copolymer by selective precipitation.

To do this, the precipitate from above is dissolved in 5 ml of toluene. With agitation, 7 ml of a methyl ethyl ketone/-acetone solution (1:1 volume ratio) are slowly added, resulting in a very fine dispersion. Approximately, 15 ml of a methanol/methyl ethyl ketone/acetone solution (1:2:2 volume ratio) are slowly added with agitation until coagulation of a white precipitate begins. The mixture is centrifuged and the clear supernatant liquid decanted from the precipitate. The supernatant liquid contains the free polystyrene which can be characterized by gel permeation chromatography. The precipitate contains the free EPDM rubber as well as the EPDM-polystyrene graft copolymer. The graft to rubber ratio of this sample can be determined by infrared spectroscopy. The percentage of the rubber which is grafted with polystyrene is then calculated via a statistical method using the graft to rubber ratio, the molecular weight of the EPDM rubber and the molecular weight of the polystyrene, assuming the free polystyrene and grafted polystyrene have the same molecular weight. This statistical method is described by L. H. Tung and R. M. Wiley in the Journal of Polymer Science. Polymer Physics Edition, Volume. 11, page 1413, 1973.

EXAMPLES 4 to 6

The operative modalities of example 1 were repeated for preparing blends containing the same components of example 1 with the exception that the EPDM elastomer containing polystyrene grafted thereon (component $C_1$) had the following composition: 50% by weight of EPDM (Mooney viscosity 62-72 ML-4 at 100° C. and a iodine number of 18), 43% by weight of grafted polystyrene and 7% by weight of free polystyrene having a weight average molecular weight (Mw) of 360,000, wherein the polystyrene/elastomer molar ratio in the grafted phase is 1.2.

The characteristics of the so obtained blends are as follows:

TABLE II

|  | UNITS | EX. 4 | EX. 5 | EX. 6 |
|---|---|---|---|---|
| COMPONENT A |  | 75 | 66.7 | 58.3 |
| COMPONENT B |  | 15 | 13.3 | 11.7 |
| COMPONENT $C_1$ |  | 10 | 20 | 30 |
| MECHANICAL PROPERTIES |  |  |  |  |
| IZOD | J/m | 84 | 170 | 310 |
| Ultimate tensile strength | N/mm$^2$ | 34 | 31 | 32.5 |
| Elastic modulus | N/mm$^2$ | 1550 | 1500 | 1350 |
| THERMAL PROPERTIES |  |  |  |  |
| VICAT at 1 kg | °C. | 103 | 102 | 101 |
| VICAT at 5 kg | °C. | 90 | 86 | 80 |

EXAMPLE 7

The operative modalities of example 1 were repeated for preparing a blend constituted by:

66.7% by weight of the impact-resistant vinylaromatic polymer of example 1;

13.3% by weight of polyethylene of example 1, and

20% by weight of an EPDM elastomer containing polystyrene grafted thereon (component $C_2$) having the following composition: 50% by weight of EPDM (Mooney viscosity 62-72 ML-4 at 100° C. and an iodine number of 18), 28% by weight of grafted polystyrene and 22% of free polystyrene having a weight average molecular weight (Mw) of 207,000, wherein the polystyrene/elastomer molecular ratio in the grafted phase was 1.1.

The properties of the blend were:

| Mechancal Properties |  |
|---|---|
| IZOD | 149 J/m |
| Ultimate tensile strength | 31.5 N/mm$^2$ |
| Elastic modulus | 1500 N/mm$^2$ |
| Thermal Properties |  |
| VICAT at 1 Kg | 102° C. |
| VICAT at 5 Kg | 86° C. |

EXAMPLES 8-9 (comparison tests)

By operating according to the operative conditions of example 1, blends were prepared constituted of:

66.7% by weight of the impact resistant polymer (A) of the type reported in example 1;

13.3% by weight of linear polyethylene (B) of the type reported in example 1;

20% by weight of a EPDM elastomer containing polystyrene grafted thereon selected: in example 8 from a grafted polymer having the following composition: 50% by weight of EPDM (Mooney viscosity 62-72 ML-4 at 100° C. and a iodine number of 18), 47.4% by weight of grafted polystyrene and 2.6% of free polystyrene having a weight average molecular weight (Mw) of 1,320,000 and wherein the polystyrene/elastomer molar ratio in the grafted phase is 0.35; and in Example 9 from a grafted polymer ($C_4$) having the following composition:

50% by weight of EPDM (Mooney viscosity 62-72 ML-4 at 100° C. and aniodine number of 18), 41.8% by weight of grafted polystyrene and 8.2% by weight of free polystyrene having a weight average molecular weight (Mw) 1,746,000 and wherein the polystyrene/elastomer molar ratio in the grafted phase is 0.18.

The characteristics of the thus-obtained blends are:

TABLE III

|  | UNITS | Example 8 | Example 9 |
|---|---|---|---|
| COMPONENT A |  | 66.7 | 66.7 |
| COMPONENT B |  | 13.3 | 13.3 |
| COMPONENT C$_3$ |  | 20 | — |
| COMPONENT C$_4$ |  | — | 20 |
| MECHANICAL PROPERTIES |  |  |  |
| IZOD | J/m | 80 | 61 |
| Ultimate tensile strength | N/mm$^2$ | 32 | 33 |
| Elastic modulus | N/mm$^2$ | 1550 | 1600 |
| THERMAL PROPERTIES |  |  |  |
| VICAT at 1 Kg | °C. | 101 | 102 |
| VICAT at 5 Kg | °C. | 86 | 87 |

EXAMPLES 10-11 (comparison tests)

By operating according to the operative modalities of Example 1, the blends were prepared constituted by:

58.3% by weight of a styrene polymer (A) selected from a crystal styrene homopolymer (A$_1$) and an impact-resistant styrene polymer (A$_2$) containing 7.75 of polybutadiene rubber;

11.3% of polyethylene (B) of example 1;

30% of the EPDM elastomer containing polystyrene grafted thereon (C) of example 1.

The properties of the so-obtained blends are:

TABLE IV

|  | UNITS | Example 10 | Example 11 |
|---|---|---|---|
| COMPONENT A$_1$ |  | 58.3 | — |
| COMPONENT A$_2$ |  | — | 58.3 |
| COMPONENT B |  | 11.3 | 11.3 |
| COMPONENT C |  | 30 | 30 |
| MECHANICAL PROPERTIES |  |  |  |
| IZOD | J/m | 78 | 172 |
| Ultimate tensile strength | N/mm$^2$ | 35 | 26 |
| Elastic modulus | N/mm$^2$ | 1600 | 1250 |
| THERMAL PROPERTIES |  |  |  |
| VICAT at 1 Kg | °C. | 100 | 99 |
| VICAT at 5 Kg | °C. | 82 | 78 |

We claim:

1. A thermoplastic composition based on a polyolefin and a vinylaromatic polymer, having an improved combination of physical, mechanical and thermal properties, comprising:

from 40 to 80% by weight of a vinyl aromatic polymer (A) containing, as an elastomeric component, from 0.5 to 5% by weight of a vinyl aromatic monomer-conjugated diene linear block polymer and from 5 to 15% of a diene rubber;

from 5 to 50% by weight of a polyolefin (B); and from 10 to 50% by weight of an olefinic elastomer (C) containing, grafted thereon, a vinyl aromatic polymer, wherein the molar ratio between the vinyl aromatic polymer and the olefinic elastomer in the grafted phase is greater than 0.8; the sum of components (A), (B) and (C) being equal to 100%.

2. The thermoplastic composition of claim 1, which comprises:

from 50 to 70% by weight of vinyl aromatic polymer (A);

from 10 to 30% by weight of a polyolefin (B); and from 10 to 40% by weight of an olefinic elastomer (C) containing grafted thereon a vinyl aromatic polymer.

3. The thermoplastic composition of claim 1, wherein the amount of the diene rubber in the vinyl aromatic polymer (A) ranges from 7 to 12% by weight.

4. The thermoplastic composition of claim 1 or 2, wherein the amount of the vinyl aromatic monomer-conjugated diene linear block polymer, in the vinyl aromatic polymer (A) ranges from 2 to 5% by weight.

5. The thermoplastic composition of claim 1 or 2, wherein the vinyl aromatic monomer conjugated diene linear block polymer contains from 20 to 75% by weight of recurring units of a vinyl aromatic monomer and, correspondingly, from 80 to 25% by weight of recurring units of a conjugated diene.

6. The thermoplastic composition of claim 1 or 2, wherein the linear block polymer is constituted of pure polymeric blocks of vinyl aromatic monomer and conjugated diene monomer.

7. The thermoplastic composition of claim 1 or 2, wherein the linear block polymer contains random or tapered (B/S) polymeric segments of vinyl aromatic monomer and of conjugated diene, or combinations thereof.

8. The thermoplastic composition of claim 1 or 2, wherein the linear block polymer is constituted of random or tapered (B/S) copolymers of vinyl aromatic monomer and of conjugated diene, or combinations thereof.

9. The thermoplastic composition of claim 1 or 2, wherein the polyolefin is an ethylene, propylene or butene polymer.

10. The thermoplastic composition of claim 9, wherein the polyolefin is low density, medium density or high density polyethylene.

11. The thermoplastic composition of claim 1 or 2, wherein said olefinic elastomer (C) is a rubber-like copolymer having a Mooney viscosity ranging from 10 to 150 ML-4 at 100° C., constituted of at least two different straight chain α-monoolefins with at least one other copolymerizable non-conjugated diene.

12. The thermoplastic composition of claim 11, wherein said α-monoolefin is ethylene and the other α-monoolefin is a longer chain olefin than ethylene, and the weight ratio of ethylene to said other alpha-monoolefin ranges from 20/80 to 80/20.

13. The thermoplastic composition of claim 1 or 2, wherein the olefinic elastomer is an ethylene/propylene/non-conjugated diene terpolymer having a diene content of about 2 to 20% by weight of the terpolymer, said terpolymer having a Mooney viscosity (ML-4), measured at 100° C., ranging from 30 to 90 and an iodine number higher than 5.

14. The thermoplastic composition of claim 13, wherein the diene content of said terpolymer ranges from 8 to 18% by weight and the iodine number of the terpolymer ranges from 10 to 40.

15. The thermoplastic composition of claim 1 or 2, wherein the vinyl aromatic polymer is constituted of monomer units having the formula:

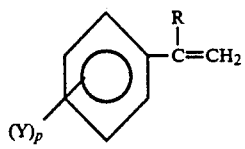

wherein:
R represents hydrogen or an alkyl radical having from 1 to 4 carbon atoms;
Y represents hydrogen, a halogen or an alkyl radical having from 1 to 4 carbon atoms, and
p is 0 or an integer ranging from 1 to 5.

16. The thermoplastic composition of claim 1 or 2, wherein the molecular weight of the vinyl aromatic polymer ranges between 50,000 and 500,000.

17. The thermoplastic composition of claim 1 or 2, wherein the vinyl aromatic polymer/olefinic elastomer molar ratio in the grafted phase ranges from 1 to 2.

18. The thermoplastic composition of claim 1 or 2, which further comprises reinforcing additives, flame retarding agents, dyestuffs, pigments, stabilizers and/or lubricants.

19. The thermoplastic composition of claim 18, wherein the stabilizer is of the type employed for vinylaromatic polymers and/or polyolefins and is present in the composition in an amount ranging from 0.05 to 5% by weight, with respect to the weight of the total composition.

20. The thermoplastic composition of claim 18, wherein said reinforcing additive is a member selected from the group consisting of glass fibers, carbon fibers, organic or inorganic high-modulus fibers and metal fibers in an amount not greater than 50% by weight with respect to the total composition.

21. The thermoplastic composition of claim 20, wherein said reinforcing additive is present in an amount not greater than 30% by weight with respect to the weight of the composition.

* * * * *

UNITED STATES PATENT AND TRADEMARK OFFICE
CERTIFICATE OF CORRECTION

PATENT NO.    : 5,290,837
DATED         : March 1, 1994
INVENTOR(S)   : Dario GHIDONI, et al.

It is certified that error appears in the above-indentified patent and that said Letters Patent is hereby corrected as shown below:

On the title page, Item [54] and Column 1, Lines 2,3,and 4, should read as follows:

--THERMOPLASTIC COMPOSITIONS BASED ON A POLYOLEFINE AND A VINYL AROMATIC POLYMER --.

Signed and Sealed this

Twenty-sixth Day of July, 1994

*Attest:*

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,290,837

DATED : March 1, 1994

INVENTOR(S) : Dario Ghidoni et al

It is certified that error appears in the above-indentified patent and that said Letters Patent is hereby corrected as shown below:

On the title page: Item[54] and column 1, line 3, delete "Polyolefine" and insert --Polyolefin--.

Signed and Sealed this

Twenty-seventh Day of September, 1994

Attest:

BRUCE LEHMAN

Attesting Officer

*Commissioner of Patents and Trademarks*